United States Patent
Tesch (10) Patent No.: US 6,875,305 B2
(45) Date of Patent: Apr. 5, 2005

(54) DEVICE AND A PROCESS FOR WELDING PLASTICS PROFILES

(75) Inventor: Wolfgang Tesch, Heimertingen (DE)

(73) Assignee: Urban GmbH & Co. Maschinenbau KB, Memmingen (DE)

(*) Notice: Subject to any disclaimer, the term of this patent is extended or adjusted under 35 U.S.C. 154(b) by 0 days.

(21) Appl. No.: 10/366,312

(22) Filed: Feb. 14, 2003

(65) Prior Publication Data

US 2003/0155070 A1 Aug. 21, 2003

(30) Foreign Application Priority Data

Feb. 15, 2002 (DE) .......................... 102 06 662

(51) Int. Cl.$^7$ .............................................. B29C 63/20
(52) U.S. Cl. ............................. 156/304.6; 156/304.1; 156/304.2; 156/583.1
(58) Field of Search .................... 156/304.1, 304.2, 156/304.5, 304.6, 499, 556, 583.1

(56) References Cited

U.S. PATENT DOCUMENTS

| | | | | |
|---|---|---|---|---|
| 4,909,892 A | * | 3/1990 | Quinn et al. ................ | 156/499 |
| 5,006,198 A | * | 4/1991 | Pasquini ..................... | 156/559 |
| 5,385,628 A | * | 1/1995 | Davis et al. ................. | 156/499 |
| 5,902,447 A | * | 5/1999 | Johnson et al. ............. | 156/499 |
| 6,273,988 B1 | * | 8/2001 | Zollinger et al. ......... | 156/304.2 |

FOREIGN PATENT DOCUMENTS

| | | | | |
|---|---|---|---|---|
| DE | 4306683 A1 | * | 9/1994 | ........... B29C/65/78 |
| DE | 4323728 A1 | * | 1/1995 | ........... B29C/65/20 |
| EP | 678374 A2 | * | 10/1995 | ........... B29C/65/20 |
| EP | 796720 A2 | * | 9/1997 | ........... B29C/65/20 |
| EP | 1136234 A1 | * | 9/2001 | ........... B29C/65/20 |

OTHER PUBLICATIONS

English Translation of EP 678374 A2.*

* cited by examiner

Primary Examiner—Sue A. Purvis
(74) Attorney, Agent, or Firm—Jacobson Holman PLLC (57) ABSTRACT

A device for welding plastic profiles, including at least two carriages for holding plastic profiles, stoppers for adjustment, stoppers for welding and at least one heating element. The motion of the plastic profiles can be controlled by the device during the welding in such a way that optionally at least two plastic profiles which have to be connected with each other move against each other or one plastic profile stops and the other moves toward it.

11 Claims, 6 Drawing Sheets

Urban

DEVICE AND A PROCESS FOR WELDING PLASTICS PROFILES

FIELD OF THE INVENTION

The invention relates to a device for welding plastics profiles that are cut into a miter and are welded to one another at a welding face located on the miter cuts, in which the plastics profiles to be connected are mounted and held on moveable carriages, and the position of the carriages may where appropriate be fixed. The invention furthermore relates to a process for making plastics profile frames.

BACKGROUND OF THE INVENTION

Profile frames for windows and doors generally comprise, in the simplest form, respectively four profile rods that have to be welded if plastics material is used. Frequently, however, posts or bars are also used to divide them. Profile frames without posts or bars can be welded to one another without difficulty. This would be possible with posts or bars too, but only above a certain size. To weld the profile rods, a range of devices for welding plastics profiles is known. A distinction is made here between single-head, sequential, four-head, six-head and eight-head machines. When single-head machines are used, each corner connection is welded individually to the profile frame. Sequential machines are constructed with two or more welding heads. Here, the profile frames are welded first on one side and then on the other side. The profile frames with posts can also be made such that first the post connection and then the corner connections are made, with a separate operational step being required for each side. If four-head to eight-head machines are used, the profile frames are typically welded in one operational step. However, it is also possible to make the post connection on other machines; this may be done, for example, by welding the post connection on separate machines. However, it is also known for the post connections to be secured to the frame for example by screws. A further possibility is to make the welded connection or screwed connection of the post between two profile rods first and then, in a final operational procedure, to weld the frame, for example on a four-head welding machine.

The welding machines described above also differ from one another in that different feed processes are used during the joining procedure for the profile rods that are heated up and are to be welded together. For this, two feed processes are known. One is what is called the diagonal feed process, and the other is what is called the parallel feed process. In the diagonal feed process, after heating up at least one profile rod is moved at an angle of 45° in relation to the later welded connection or welding face. In the parallel feed process, the direction of movement is at 90° to the welding faces. The two different processes are determined by the type of construction of the welding machines and the shape of the windows or doors. In principle, the aim is to use the parallel feed process, since better corner strength values of the welded connections can be achieved with it. This is in particular because during joining, in contrast to the diagonal feed process, there is no relative movement along the plane of joining.

During welding of the plastics profile rods, the functional sequence is the following:

The profile rods have to be clamped in the correct position on the beds or carriages with the aid of stop faces on the longitudinal sides and adjustments of the miter faces. Here, the carriages move toward fixed or adjustable stops. During the partial melting and warming up of the welding faces against the heating element, further stops are used. Only when the connection is joined do the carriages move into their end position. Here, a distinction is made between stops for the insertion and welding positions and stops for the joining positions. The different feed processes also result in different carriage positions. The stops are brought into the operational position from their starting position, for example by pneumatic cylinders. The problem of a machine with both feed processes is in this case the large number of stops required for this. Furthermore, the carriages would have to be in different starting positions, and the adjusting parts and heating elements would have to be brought into two different operational positions. For this construction, there is a considerable space requirement in the machine, and in most cases this is not available and additionally gives rise to considerable extra costs.

BRIEF SUMMARY OF THE INVENTION

Taking as a starting point the prior art described above, the object of the invention is to provide a way of welding plastics profiles that can perform both the functional sequence of the "diagonal" feed process and also the functional sequence of the "parallel" feed process, with the complexity of the stops, adjusting parts and heating elements required and the complexity of the required positioning of these structural parts being kept as low as possible.

The invention provides a device for welding plastics profiles that are cut into a miter and are welded to one another at a welding face located on the miter cuts, in which the plastics profiles to be connected are mounted and held on movable carriages. The position of the carriages may where appropriate be fixed.

The device described in this way is distinguished by the fact that the movement of the plastics profiles (respectively of the carriages) is controllable by the device during the welding such that optionally at least two plastics profiles to be connected may be moved toward one another or one plastics profile is stationary and the other plastics profile is moved toward it. As a result of the device according to the invention, a device is obtained that avoids significant engineering expense associated with the plant such as the need to provide additional stops, pneumatic cylinders, carriage tracks and the like, for example, for the different types of movement. At the same time, it is ensured that both feed processes, until now capable of being performed only on different machines, can now be implemented optionally on one welding device. The functional or operational step relating to better corner strength, that of joining the welded connection, is in this case carried out only by the parallel feed process. Parallel feed is achieved by the carriage or carriages performing only a small movement in the Y direction of the device. This movement takes the form of a small opening stroke at the beginning of the joining procedure, necessary to compensate for the different heights of the corners of the profile rods. At the same time as the closing stroke there is a simultaneous movement of the second carriage in the X direction of the device, so that the result is that the miter faces or welding faces are joined without any relative movement. A joining movement by what is called the diagonal feed process is also possible using the device according to the invention, for example by the carriage for movement in the Y direction of the device remaining stationary in the end position throughout the welding sequence, and the carriages for the X movement then moving toward these carriages located in the end position with the plastics profiles located thereon. However, the assumption is made that the invention will result in the joining movement being performed in the welding procedure chiefly without any relative movement between the miter faces or welding faces, and that only the operational steps of positioning and heating up will be performed by what is called the diagonal feed process.

The device according to the invention is also distinguished by the fact that the direction of movement of the plastics profile or profiles in relation to the welding face is controllable by the device optionally at an angle of 45° or 90°. This embodiment of the invention ensures that no relative movement takes place between the welding faces of the plastics profiles. For example, it is possible for a carriage first to perform a movement in relation to the welding face at an angle of 45°, for example to position the plastics profile against the heating element, and then after the partial melting procedure has been carried out to perform a movement at an angle of 90° in relation to the welding face. This ensures that the undesirable relative movement between the two miter faces or welding faces during the joining procedure is avoided.

According to the invention, it has also been found that it is advantageous if at least one plastics profile is movable by the device such that a short opening and closing stroke relative to the Y direction of the device may be performed simultaneously with the movement of the second plastics profile in the X direction in controlled manner to perform the required joining movement, such that the miter faces may be moved toward one another along a notional line on this welded connection with no offset. The notional line can in this case be designated as the line D/E.

A further aspect of the invention is provided in that the second plastics profile is movable on a guide track both in the X direction and in the Y direction of the device. This means that, by means of a carriage controlled on a guide track, the plastics profile can perform a movement both in the X direction and in the Y direction or indeed in both directions simultaneously. The directions X and Y are in this case defined by the direction of the device in which the procedure of joining the plastics profiles takes place.

A further development of the device is distinguished by the fact that the guide track is constructed to be a cross slide track. This is a solid solution to provide a movement in X and/or Y-direction. But also a guide track, which is turnable gives the possibility of a movement in X and Y-direction.

It has also been found that it is advantageous if a tracer is arranged on the first carriage for the Y direction and a contact roller is arranged on the second carriage for the X and the Y direction, corresponding to one another. The contact roller here senses the position of the first carriage and moves the second carriage toward the first carriage when the latter performs the short closing stroke. In this case, the movement is coordinated such that no offset or relative movement occurs at the welding face.

A further development of the invention is distinguished in that the first carriage for the Y direction is guided and controlled with the second carriage for the X and the Y direction during the joining procedure by parallel stops. This embodiment of the invention ensures that there is a movement in the same direction, or synchronous movement, toward one another of at least two plastics profile rods to be welded. The undesirable relative movement is avoided as a result of this control.

A further development of the invention provides for the carriages to be controlled pneumatically and/or hydraulically.

A further development of the device according to the invention is distinguished in that a switching or control device switches on and/or controls the direction of movement of the plastics profiles as selected. As already mentioned, in this case there is a range of control possibilities. For example, an electronic control may provide for the necessary movement sequences. However, this may also be done by means of mechanical, pneumatic or hydraulic controls known for this purpose.

The object of the invention is also achieved by a process for making frames comprising plastics profiles cut into a miter by adjusting at least two plastics profiles and heating up the welding face formed from the miter faces by a heating mirror or heating element with simultaneous movement of the plastics profiles in the direction of the heating element in a direction of movement of 45° in relation to the welding face and subsequent pivoting outward of the heating element, distinguished by the following process steps:

performing a short opening stroke A at the beginning of joining in a direction of movement of 45° away from the welding face to cancel out the amount of difference between the miter faces of the welded connection;

subsequent simultaneously a short closing stroke B and a controlled movement of the plastics profiles toward one another in a direction of movement of 45° in relation to the welding face such that there is no relative movement of the welded connection in a direction parallel to the miter faces.

Here, control of the movement of the plastics profiles toward one another is advantageously performed by means of corresponding mechanical and/or electrical and/or pneumatic controls. By means of the process according to the invention described in this way, there is again no relative movement at the welding faces to be joined during the welding procedure.

A further development of the process according to the invention is distinguished in that the motion of the second plastic profile is derived from the motion of the first plastic profile respectively the carriage carrying the first plastic profile.

In this way it is possible to use only one drive for the movement of both carriages/profiles. Furthermore the movement of the two carriages doesn't need further control, because the derived movement leads to a restricted guidance.

The object of the invention is also achieved by a process distinguished by the fact that a device as described above in accordance with the invention is used in the process to make frames comprising plastics profiles cut into a miter.

BRIEF DESCRIPTION OF THE DRAWINGS

The invention will be explained in more detail below with reference to example embodiments and drawings, in which.

DETAILED DESCRIPTION OF PREFERRED EMBODIMENTS

Plastics windows or doors are typically welded by plastics welding machines that are currently substantially made in two different types of construction. Here, it is known to make a corner connection between two plastics profiles with a miter cut by connecting them to one another at the miter cuts, with the plastics profiles that are to be connected being mounted movably and held on carriages and the position of the carriages where appropriate being capable of being fixed. In accordance with the prior art, the plastics profiles are guided through with the two plastics profiles in two different directions of movement with respect to one another.

On the one hand, devices are known that perform, during the joining procedure, a direction of movement, relative to the welding face that is provided by the miter cuts, at an angle of 45°. This is known and is called the diagonal feed process. The disadvantage of this process is that when the partly melted plastics profiles are joined, a relative movement takes place at the welding face between the two profiles. Consequently, sufficient strength of the corner of the welded connection is not always assured.

Figure 1:
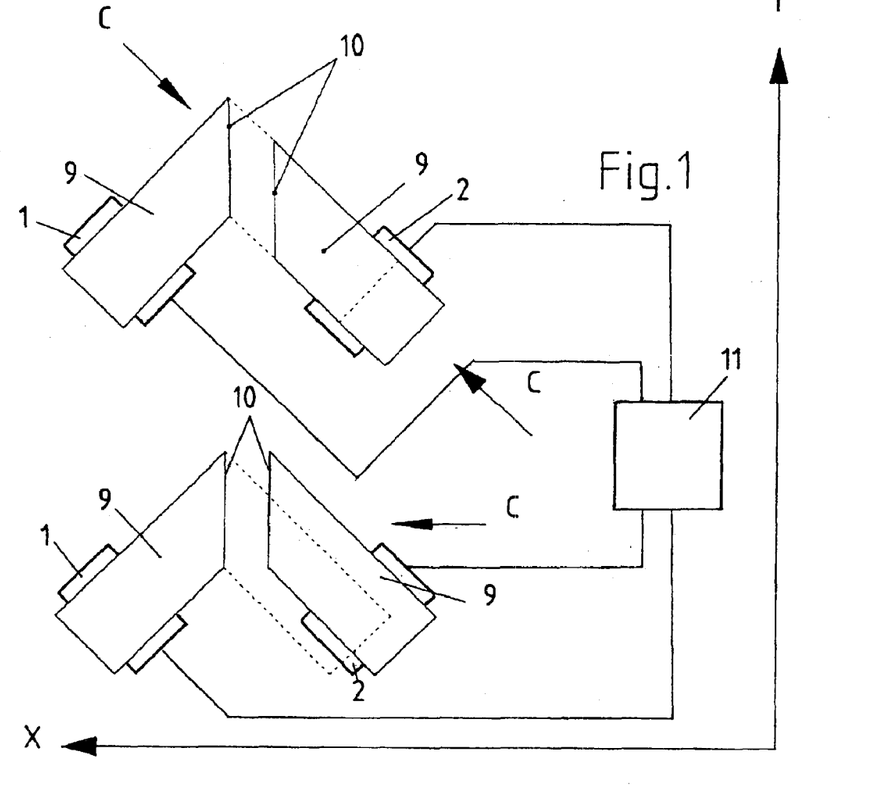
FIG. 1 shows a diagrammatic illustration of the feed process and the device.

The upper part of FIG. 1 illustrates diagrammatically a feed process of this kind. Reference numeral 9 in this case designates the plastics profiles, here already cut into a miter. Reference numeral 10 designates the welding face that is provided by both miter cut faces. The arrows, labeled C, designate the direction of movement of the profiles, which may be downward from above or indeed upward from below. However, it is also entirely conceivable for only one profile to perform the movement toward the other profile. Additionally, a system of directions is predetermined for both FIGS. 1 and 2 as X Y, which for the sake of better clarity labels the direction of movement of the plastics profiles (by the carriages respectively) within the welding device during the positioning, heating and joining procedure. X and Y direction are orthogonal.

As can be seen from the arrows C, the welding faces 10 of the plastics profiles 9 move toward one another, in such a way that the direction of movement is at an angle of 45° relative to the welding face. This feed process is also called a diagonal feed process, as already mentioned.

The lower part of FIG. 1 then shows the process, known to those skilled in the art as a parallel feed process, for joining together plastics profile corners that have previously been heated. The arrow C once again designates the direction of movement. It can be seen that, with this type of bringing the two plastics profiles 9 together, there is no parallel shift or relative shift at the welding faces during the joining procedure. This welded connection is as a whole distinguished by the fact that substantially better corner strength values can be achieved in the welded connections. The differences between the two feed processes thus result in different strengths in the welded connections. It is clearly visible in FIG. 1 that the direction of movement relative to the welding faces to be connected is in this case at an angle of 90° relative to this welding face.

A control means 11 is provided, which is connected to the drives (not shown) of the carriages 1, 2. Depending of the choose which process is to be used, the control means 11 activates the corresponding drives or fixes the position of the carriages 1, 2.

Figure 3:
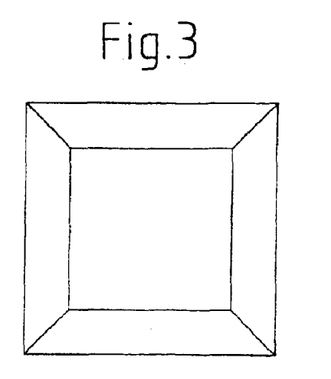
FIG. 3 shows a plastics profile frame comprising four profile rods.

FIG. 3 shows a frame made from four profile rods that can be made both by the diagonal feed and the parallel feed process. This figure is provided purely for the sake of better understanding of the process sequences as a whole.

Figure 4:
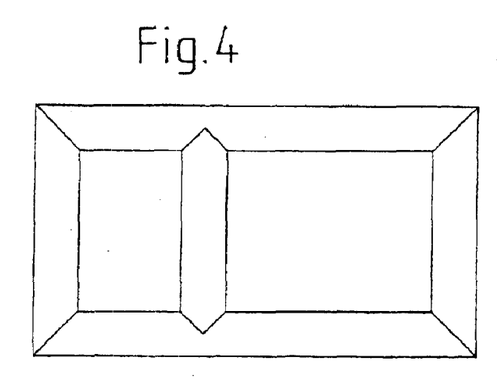
FIG. 4 shows a plastics profile frame comprising four profile rods with a post or bar.

FIG. 4 shows a profile frame that is obtained from four profile rods and additionally has a post or bar. This figure too is provided purely for the sake of better understanding of the process sequences.

Figure 5:
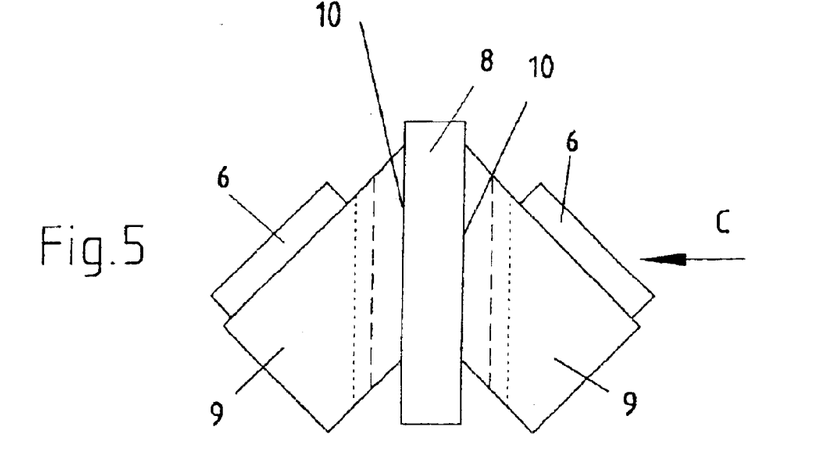
FIGS. 5 to 7 show an illustration of making a corner connection on profile frames.
Figure 6:
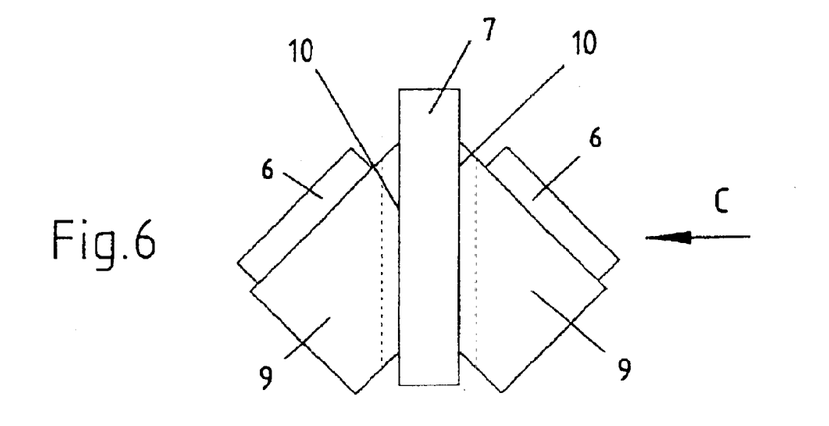
Figure 7:
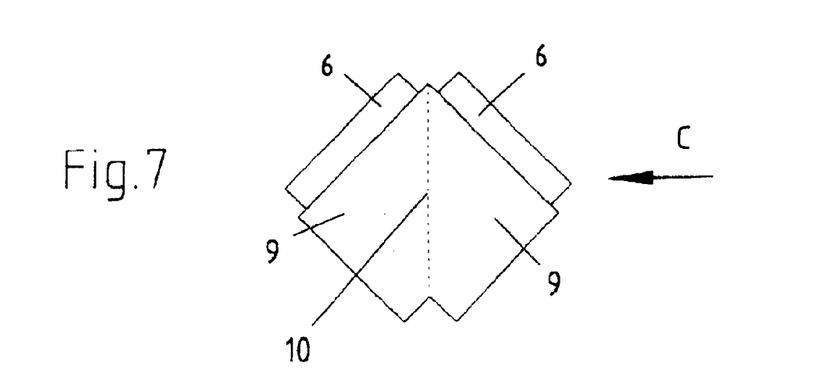

FIGS. 5, 6 and 7 show a profile frame being made by what is called the parallel feed process, that is to say with a direction of movement of the profiles in relation to the welding face of 90°. A corner connection of this type on the profile frame may be made, for example, individually by means of what are called single-head welding machines. The reference numeral 9 designates the plastics profiles cut into a miter. These plastics profiles are located on carriages, not shown in FIGS. 5, 6 and 7. The plastics profiles are guided on the carriage toward a stop 6. In FIG. 5, in a first step, first of all the profiles 9 are positioned against the stops 6 and an adjustment means 8. The arrow labeled C once again designates the direction of movement of the right-hand plastics profile 9. The reference numeral 10 designates the later welding faces obtained from miter cuts. FIG. 6 illustrates how, once the plastics profiles 9 have been positioned, the heating element 7 appears after the adjustment means 8 has been pivoted outward. The dotted lines illustrate, and this is also apparent on comparing FIGS. 5 and 6, that part of the plastics profile 9 has already been melted away by the heating element in the illustration of FIG. 6. Once the two plastics profiles 9 have been plasticized sufficiently, the heating element 7 can be pivoted out of the region of the later welded connection. The arrow C once again indicates the direction of movement. As already mentioned, in the example illustrated, the device for welding the plastics profiles is constructed such that only one profile moves toward the other. However, machines are also known in which both profiles perform a simultaneous movement toward one another once the heating element has been removed.

FIG. 7 then illustrates the final condition once the heating element has been removed and the two plastics profiles have been guided further toward one another, with the result that in the final condition a welded connection 10 has been obtained as illustrated by the dotted line. The reference numerals 6 designate the stops that guide the plastics profiles during the joining procedure. The welded connection obtained in accordance with the illustrations of FIGS. 5, 6 and 7 is distinguished by the fact that no relative movement has taken place at the joining plane while it was being made.

Figure 8:
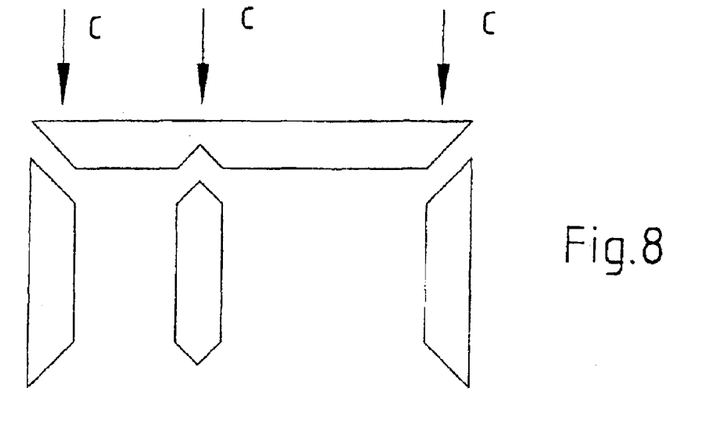
FIGS. 8 to 10 show a diagrammatic sequence for making profile frames with a post.
Figure 9:
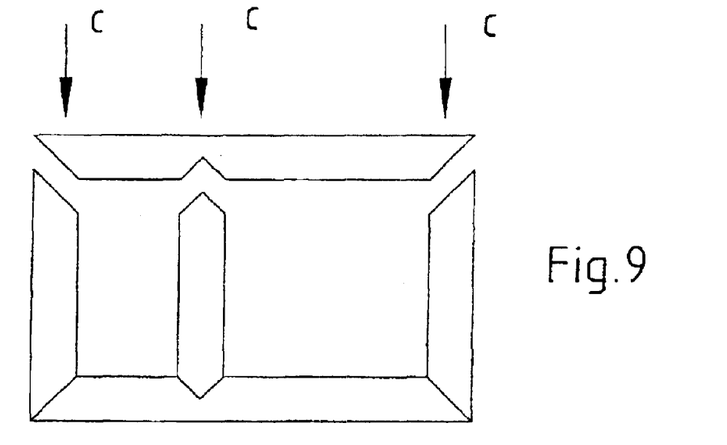
Figure 10:
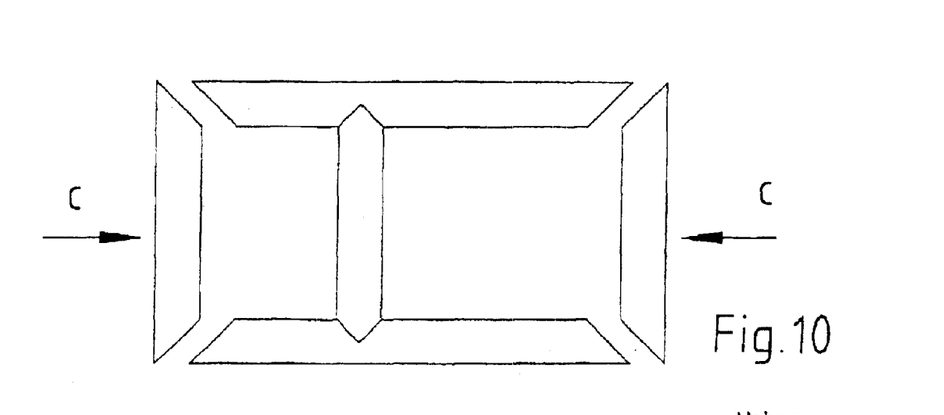

FIGS. 8, 9 and 10 show the making of a partial frame comprising a total of four profile frame pieces that are welded to one another in the illustration according to FIG. 8 such that the direction of movement of the profile in relation to the later welded connection brings about a relative shift of the miter faces in the joining plane during the joining procedure. Here, FIG. 8 shows first of all how a profile frame part is made using what is called a sequential machine. These sequential machines have, for example for the welding to be carried out in FIG. 8, at least three heating elements, of which a heating element for the post must have the construction particular thereto. Here, first of all the two side parts of the profile frame and the post are welded to the longitudinal side of the profile frame. In a further operational step, as visible in FIG. 9, the last profile frame part is then joined to the partial frame that has been obtained in this way, again by means of a sequential machine. FIG. 10 illustrates how first of all the post connection was made in a particular machine. This post connection can also be obtained by screwing in these posts, for example using particular securing means. In a subsequent operational step, as indicated by the arrows C, the last two profile frame parts are then joined to one another with the previously made partial frame. In this type of manufacture, too, the less favorable diagonal feed process is used for the work.

Figure 11:
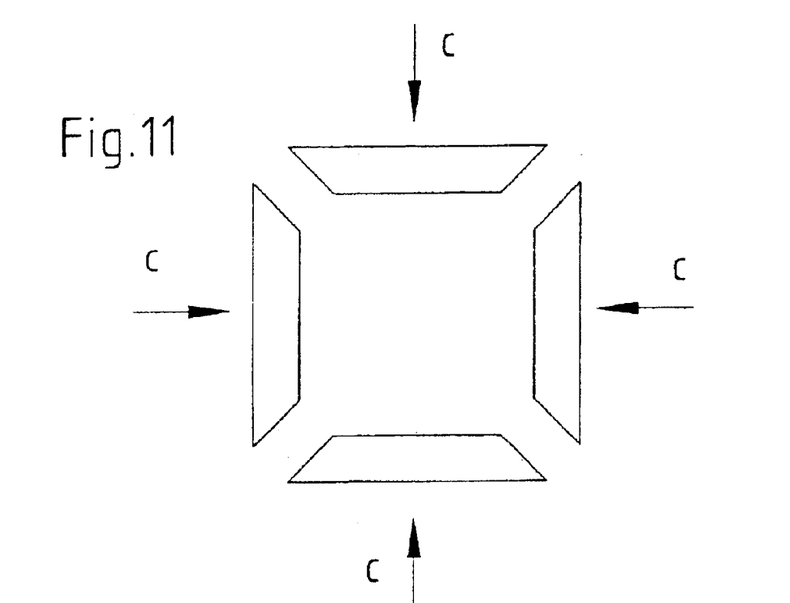
FIGS. 11 to 13 show a diagrammatic illustration of different feed processes during the making of plastics profile frames.

FIG. 11 illustrates how a frame comprising four plastics profiles is obtained, as made for example on what is called a four-head welding machine. The heating elements 7 are positioned at the miter faces of the plastics profiles. The profiles are then pressed against the heating elements, as can be seen from the arrows. Once all four miter faces have been plasticized, and after removing the heating elements, which are not illustrated in FIG. 11, the profile parts are then moved toward each other simultaneously, as can be seen from the arrows. This type of welding of plastics profiles is consequently carried out by the parallel feed process, in which there is no relative movement at the joining or welding faces because the profile parts are pressed together.

Figure 12:
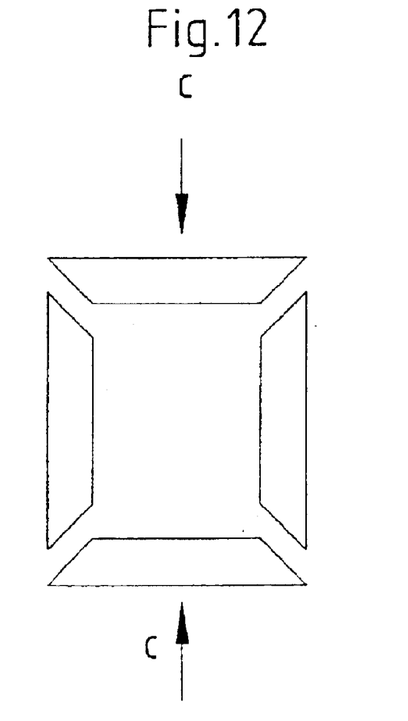

FIG. 12 shows a further possibility for making a frame from plastics profiles, in which two profile parts are movable and two profile parts are fixed in position. Once the welding faces have been plasticized, the two movable profiles are moved toward the two profiles fixed in position. With this type of connecting of the welding faces, there is a relative movement at the faces to be welded. As already mentioned, this embodiment gives welded connections that do not achieve such high corner strength values as the possibility illustrated in FIG. 11.

Figure 13:
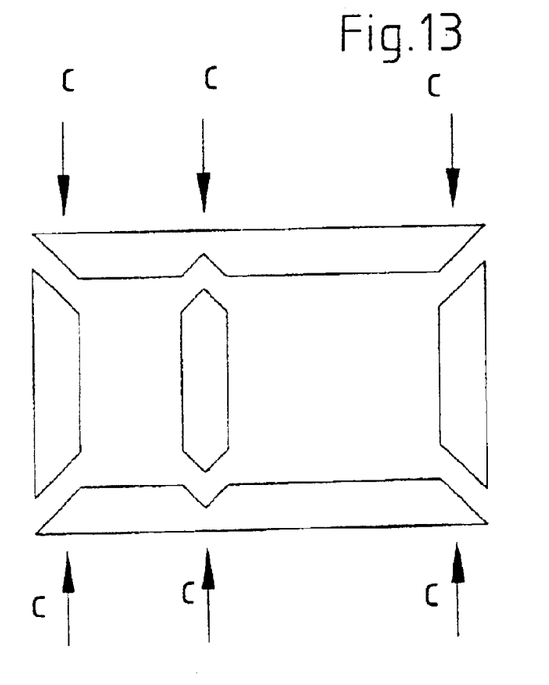

FIG. 13 shows a further possibility for connecting plastics profiles by welding, in which case the two profile parts designated C are movable and the other three profile parts are fixed in position. In the embodiment illustrated in FIG. 13, again the in fact undesirable relative movement at the welding faces during the joining procedure cannot be avoided.

Figure 14:
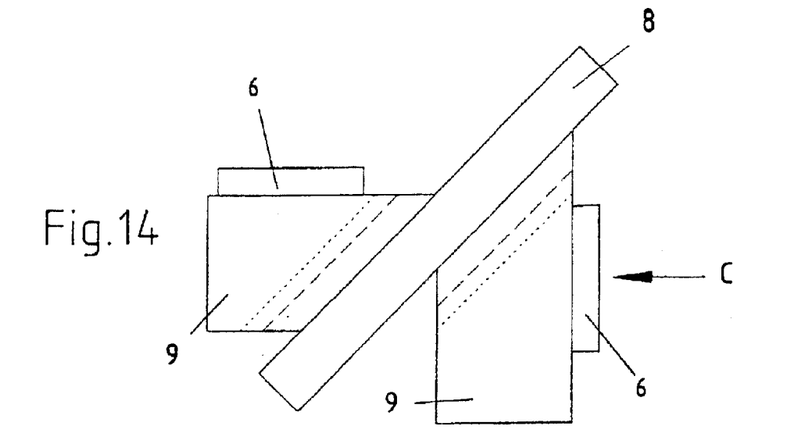

The sequence of functions for welding the profile rods will be described below again with reference to FIGS. 5 and 14, 6 and 15 and 7 and 2. The profile rods first of all have conventionally to be clamped in the correct positions on the tables or carriages of the welding device. For this purpose, the carriages move toward fixed or adjustable stops, as visible from FIGS. 5 and 14. FIG. 14. illustrates how the plastics profiles 9 are first of all brought into the correct position against stops 6 and an adjustment means 8. The dotted lines mark the later phases during the welding procedure. The longer dotted line indicates the parts of the profiles 9 that are to be melted away during the heating-up procedure, and the shorter dotted line is then the later welded connection 10 that will be obtained at the end of the joining procedure. FIG. 14 shows clearly that the right-hand profile 9, also designated by the arrow C, is offset relative to the left-hand profile such that there is a spacing between the corners of the two profiles. This means that during the joining procedure this spacing must be bridged, which results in the undesirable relative movement during the joining procedure.

Figure 15:
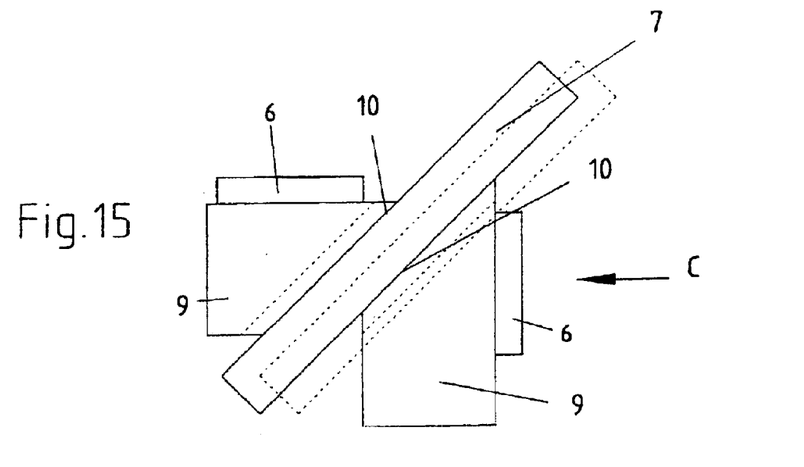

FIG. 15 shows that now, in the process sequence, the heating element 7 is arranged between the profile parts 9. The dotted line shows that the heating element also performs a movement during the warming-up procedure. The basis for this is the already previously described phase of melting away the plastics profile during heating up. For the sake of better understanding, the later welded connection 10 at the profiles 9, here at the miter cuts heated up by the heating element 7, is also illustrated diagrammatically. The arrow labeled C indicates that the plastics profile illustrated on the right-hand side in FIG. 15 moves toward the plastics profile 9 on the left-hand side.

Figure 2:
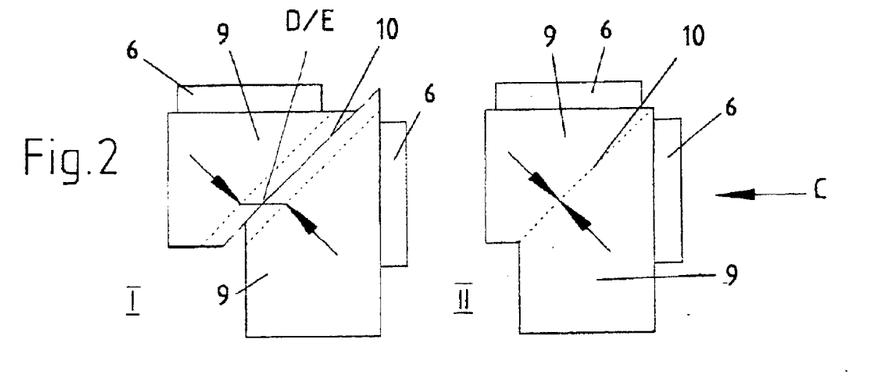
FIGS. 14, 15, 2 show a diagrammatic sequence for making a corner connection.

FIG. 2 shows the position of the two plastics profiles 9 once the heating element has been pivoted out of the miter region of the two plastics profiles 9. The position indicates the beginning of the welding or joining procedure. Here, it is clearly visible that there is still a spacing between the corners of the two profiles 9, which will only be canceled out when there is an impact of the right-hand profile moving in the direction of the second profile, on the left-hand side. It is clearly visible that the miter faces for the welded connection at the line D/E here have to have an offset in order to obtain a right-angled welded connection of the two profiles 9 with no offset at the corner connection on the outside and inside. This means that there is a relative movement at the welding face 10 that is of exactly the same size as the amount by which the right-hand plastics profile 9 projects beyond the left-hand plastics profile at the corner. As already described several times, this type of welded seam construction is unfavorable because of the smaller corner strength values that can be achieved. The position II of FIG. 2 then illustrates the final condition of the welded connection.

Figure 16:
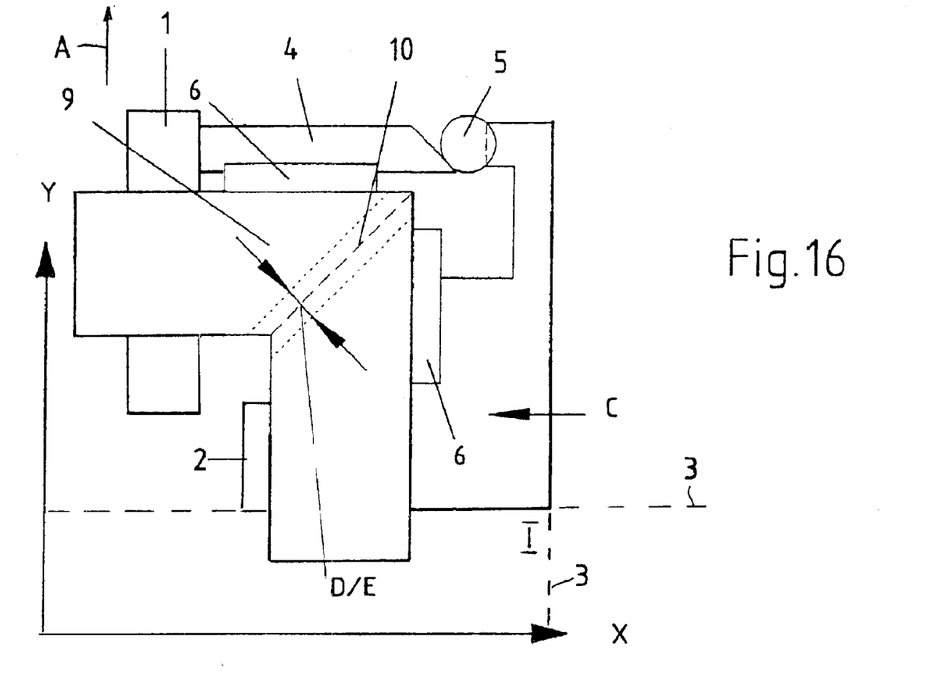
FIGS. 16 to 17 show an illustration of the functional sequence according to the invention.
Figure 17:
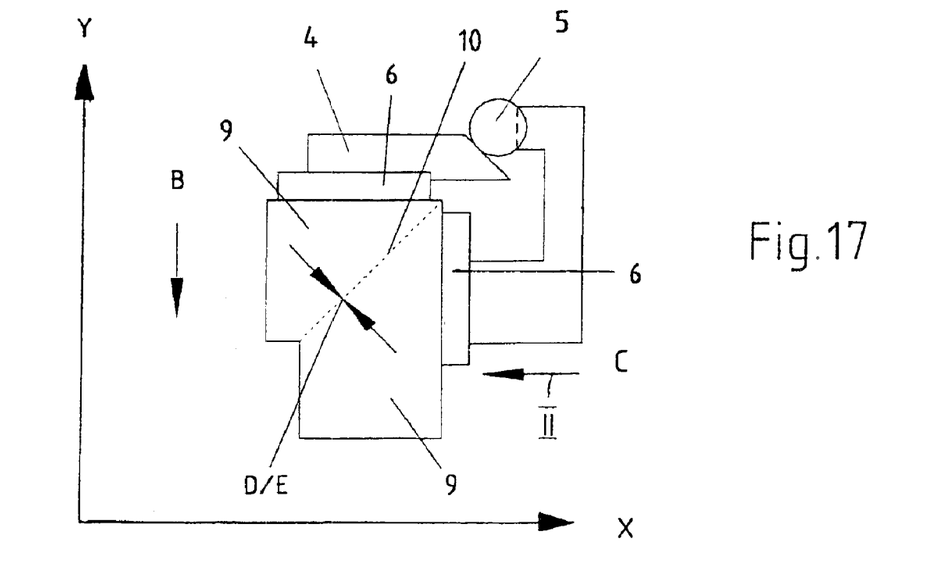

FIGS. 16 and 17 illustrate the sequence of functions for an embodiment of the invention. FIG. 16 here takes as its starting point positioning and partial melting at the heating element, as in fact already described in FIGS. 14 and 15. In contrast to FIG. 2 I, the beginning of the joining procedure, and II, the final condition of the joining procedure, it is clear from FIG. 16 that as a result of the inventive construction of the device no relative shift takes place in the line D/E. According to the invention, this is achieved in that the plastics profile 9 on the carriage 2 also performs a movement in the direction C toward the plastics profile 9 on the carriage 1. At the beginning of the joining procedure, however, in contrast to the previously known prior art, there is a short opening stroke A in the direction Y of the carriage 1 or along the Y direction in order to cancel out the spacing between the two corners of the partially melted plastics profiles 9, illustrated in FIG. 2. At the point in time at which the short opening stroke A has been performed, the joining procedure begins by a simultaneous movement of the second carriage 2 in the direction C and synchronously controlled performing of the closing stroke B. This can be seen from FIG. 17. II in FIG. 17 indicates that the final condition has then been achieved in the position of the illustration. Here, the carriage 2 is guided by means of a tracer 4, arranged on the first carriage, and a contact roller 5, arranged to correspond thereto on the guide track 3 for the second carriage 2. The guide track 3 is in this case constructed such that both a movement in the direction of the X direction and one in the direction of the Y direction are possible. The front end of the tracer 4 has a slope which contacts the contact roller 5. The angle of that slope gives a value of the movement of the second carriage 2 in X and/or Y direction.

FIG. 17 shows that no parallel shift or relative movement of the welding faces 10 in respect of one another has taken place along the line D/E. By means of the embodiment presented here, it becomes possible for the movement by the feed process, required for the joining, to take place in a coordinated way so that no relative movement takes place at the welding faces 10. As a result of the movement of the short opening and closing strokes of the first carriage coordinated with the movement of the second carriage, the difference present at the corner (A/B) is canceled out without any movement of the face itself. The engineering expense associated with the plant for a welding device according to the invention is reduced considerably, since all that is required in addition to the already known welding devices is a tracer 4, a contact roller 5 and a guide track 3. The need for additional stops for the two feed processes here is avoided. Furthermore, the different starting position for the carriages 1 and 2 and the adjusting parts that are in turn required for these are not needed by the embodiment according to the invention. This considerably reduces the engineering expense associated with the plant for a corresponding welding device. At the same time, the costs of plant are reduced.

Although the invention has been described in terms of specific embodiments which are set forth in condiserable detail, it should be understood that this is by way of illustration only and that the invention is not necessarily limited thereto, since alternative embodiments and operating techniques will become apparent to those skilled in that art in view of the disclosure. Accordingly, modifications are contemplated which can be made without departing from the spirit of the described invention.

I claim:

1. A device for welding plastics profiles that are cut into a miter and are to be welded to one another at a welding face located on said miter cuts, said device comprising at least two moveable carriages to which respective profiles are mounted, movement of the carriages being controllable during the welding such that at least one of two plastics profiles to be connected is moved toward the other of the two plastics profiles, and a control unit coordinating movement of a first carriage of said at least two moveable carriages moving in a short opening stroke and a closing stroke in opposite directions relative to each other and in a Y direction and coordinating movement of a second carriage of said at least two moveable carriages moving in an X direction simultaneously with said closing stroke of said first carriage such that the miter cuts for a welded connection are moved toward one another to join with no offset of the miter cuts.

2. The device according to claim 1, wherein a direction of movement of said plastics profiles relative to one another are controlled at one of an angle of 45° to said welding face and at an angle of 90° to said welding face.

3. The device according to claim 1, wherein the second carriage is movable on a guide track both in the X direction and in the Y direction.

4. The device according to claim 3, wherein said guide track is constructed to be a cross slide track.

5. The device according to claim 1, wherein a tracer is arranged on the first carriage and a contact roller cooperating with said tracer is arranged on the second carriage.

6. The device according to claim 5, wherein by motion of the first carriage in the Y direction during a joining procedure, the second carriage is moved by cooperation of the tracer and the contact roller in at least one of the X direction and the Y direction.

7. The device as claimed in claim 1, wherein said carriages are controlled by at least one of pneumatically and hydraulically.

8. A process for making frames comprising plastics profiles cut into a miter by adjusting at least two plastics profiles and heating up a welding face formed from the miter faces by a heating element with simultaneous movement of the plastics profiles in a direction of the heating element in a direction of movement of 45° in relation to the welding face and subsequent moving away of the heating element, said process comprising the steps of:

controlling a short opening stroke movement of one of the two profiles at a beginning of joining of the two profiles in a direction of movement of 45° away from the welding face to cancel out an amount of difference between the miter faces of a welded connection, and subsequently simultaneously controlling a short closing stroke movement of the one of the two profiles in a direction opposite to the short opening stroke and a controlled movement of the other of the two plastics profiles toward the one of the two profiles to form said welding face such that there is no movement of the welded connection of the two profiles in a direction parallel to said miter faces.

9. The process according to claim 8, wherein a device for welding the two plastics profiles cut into a miter and welded to one another at a welding face located on said miter cuts comprises at least two moveable carriages to which respective profiles are mounted and a position of the carriages is fixed, movement of the carriages is controllable by the device during the welding such that at least one of two plastics profiles to be connected is moved toward the other of the two plastics profiles.

10. A device for welding plastics profiles that are cut into a miter and are to be welded to one another at a welding face located on said miter cuts, said device comprising at least two moveable carriages to which respective profiles are mounted, movement of the carriages being controllable during the welding such that at least one of two plastics profiles to be connected is moved toward the other of the two plastics profiles, a first carriage of said at least two moveable carriages being movable to perform a short opening stroke and a closing stroke relative to a Y direction and a second carriage of said at least two moveable carriages being movable to perform a movement in an x direction simultaneously with said closing stroke of the first carriage in a controlled manner such that the miter cuts for a welded connection are moved toward one another along a line with no offset, and a tracer arranged on the first carriage and a contact roller cooperating with said tracer being arranged on the second carriage.

11. The device according to claim 10, wherein by motion of the first carriage in the Y direction during a joining procedure, the second carriage is moved by cooperation of the tracer and the contact roller in at least one of the X direction and the Y direction.

* * * * *